(12) United States Patent
Chang

(10) Patent No.: US 6,708,798 B2
(45) Date of Patent: Mar. 23, 2004

(54) EASILY CONTROLLED EXHAUST PIPE

(75) Inventor: Ming-Tien Chang, Taichung (TW)

(73) Assignee: Liang Fei Industry Co., Ltd., Fen-Yuan Hsiang (TW)

( * ) Notice: Subject to any disclaimer, the term of this patent is extended or adjusted under 35 U.S.C. 154(b) by 26 days.

(21) Appl. No.: 10/034,936

(22) Filed: Jan. 2, 2002

(65) Prior Publication Data

US 2003/0121720 A1 Jul. 3, 2003

(51) Int. Cl.[7] .............................. B01D 39/20; F01N 3/02
(52) U.S. Cl. ...................................... 181/226; 254/240
(58) Field of Search ................................. 181/222, 256, 181/258, 252, 254, 218, 227, 228

(56) References Cited

U.S. PATENT DOCUMENTS

| 4,487,288 A | * | 12/1984 | Watanabe et al. ........... 181/238 |
| 4,533,015 A | * | 8/1985 | Kojima ....................... 181/280 |
| 4,842,096 A | * | 6/1989 | Fujitsubo .................... 181/252 |
| 4,851,015 A | * | 7/1989 | Wagner et al. ................. 95/15 |
| 4,926,636 A | * | 5/1990 | Tadokoro et al. ............. 60/312 |
| 5,992,560 A | * | 11/1999 | Matsuoka et al. .......... 181/252 |
| 6,148,955 A | * | 11/2000 | Wolf et al. .................. 181/252 |
| 6,267,199 B1 | * | 7/2001 | Chang ........................ 181/252 |
| 6,454,047 B1 | * | 9/2002 | Galaitsis .................... 181/254 |

\* cited by examiner

Primary Examiner—Robert Nappi
Assistant Examiner—David Warren

(57) ABSTRACT

An easily controlled exhaust pipe has a manifold. One end of the manifold is connected to a distal end of a connecting tube. Another ends of the manifold are extended with a first branch tube and a second branch tube. The first branch tube is connected to a first outer tube and the second branch tube is connected to a second outer tube. The second branch tube has a controllable valve. Glass fibers and stainless steel and cotton structure are filled in the first and second outer tubes. A connecting piece welded between the first outer tube and the second outer tube. The controllable valve having a valve seat and washers. The valve seat controlled by a controller.

1 Claim, 6 Drawing Sheets

EASILY CONTROLLED EXHAUST PIPE

FIELD OF THE INVENTION

The present invention relates to an exhaust pipe, and particularly to an easily controlled exhaust pipe, wherein the driver may control amount of the exhaust pipe easily.

BACKGROUND OF THE INVENTION

For objects of environmental pollution, noise and exhaust gas from a car is limited with the areas. Moreover, the driving speed and sense of the driver have a great effect to the amount of the exhaust gas. For example in suburb or when climbing upwards along a mountain path, the larger power is required and thus much gas is exhausted. However, as driving in a city, it is required that the noise and exhaust gas from a car must be reduced for matching the requirement of environmental protection. In general, the amount of exhaust gas cannot be controlled as desired. Although in prior art, adjustable exhaust pipe have been developed, it is inconvenient since the user must leave the car to adjust the amount of exhaust gas by other tools.

SUMMARY OF THE INVENTION

Accordingly, the primary object of the present invention is to provide an exhaust pipe, the driver may control the variation of exhaust gas without needing to adjust the exhaust pipe for controlling the amount of the exhaust pipe by other tools. As a result, the noise may be reduced easily and the performance of acceleration is enhanced.

To achieve above objects, the present invention provides an easily controlled exhaust pipe which has a manifold. One end of the manifold is connected to a distal end of a connecting tube. Another ends of the manifold are extended with a first branch tube and a second branch tube. The first branch tube is connected to a first outer tube and the second branch tube is connected to a second outer tube. The second branch tube has a controllable valve. Glass fibers and stainless steel and cotton structure are filled in the first and second outer tubes. A connecting piece welded between the first outer tube and the second outer tube. The controllable valve having a valve seat and washers. The valve seat controlled by a controller.

The various objects and advantages of the present invention will be more readily understood from the following detailed description when read in conjunction with the appended drawing.

DETAILED DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
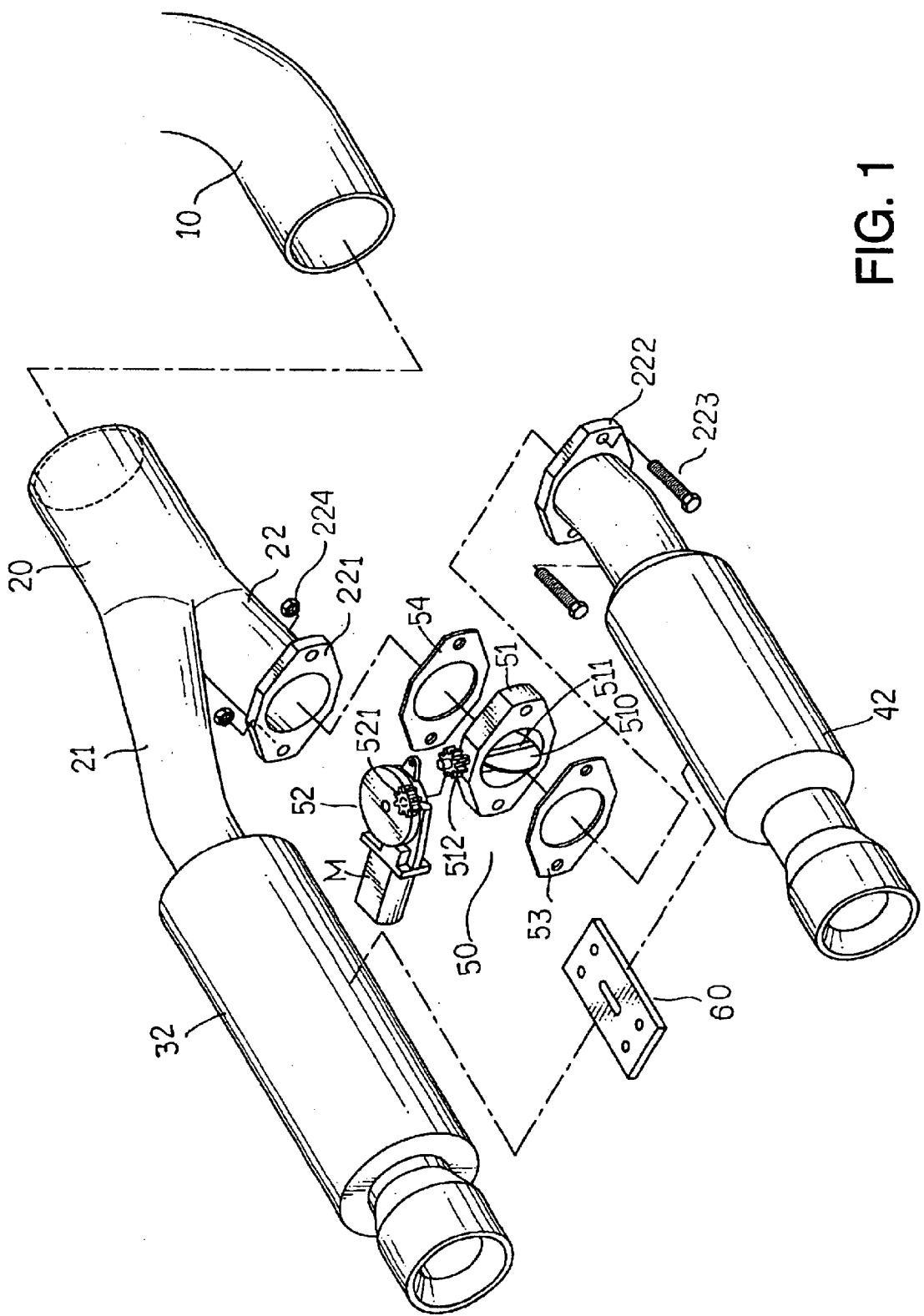
FIG. 1 is an exploded view of the present invention.
Figure 2:
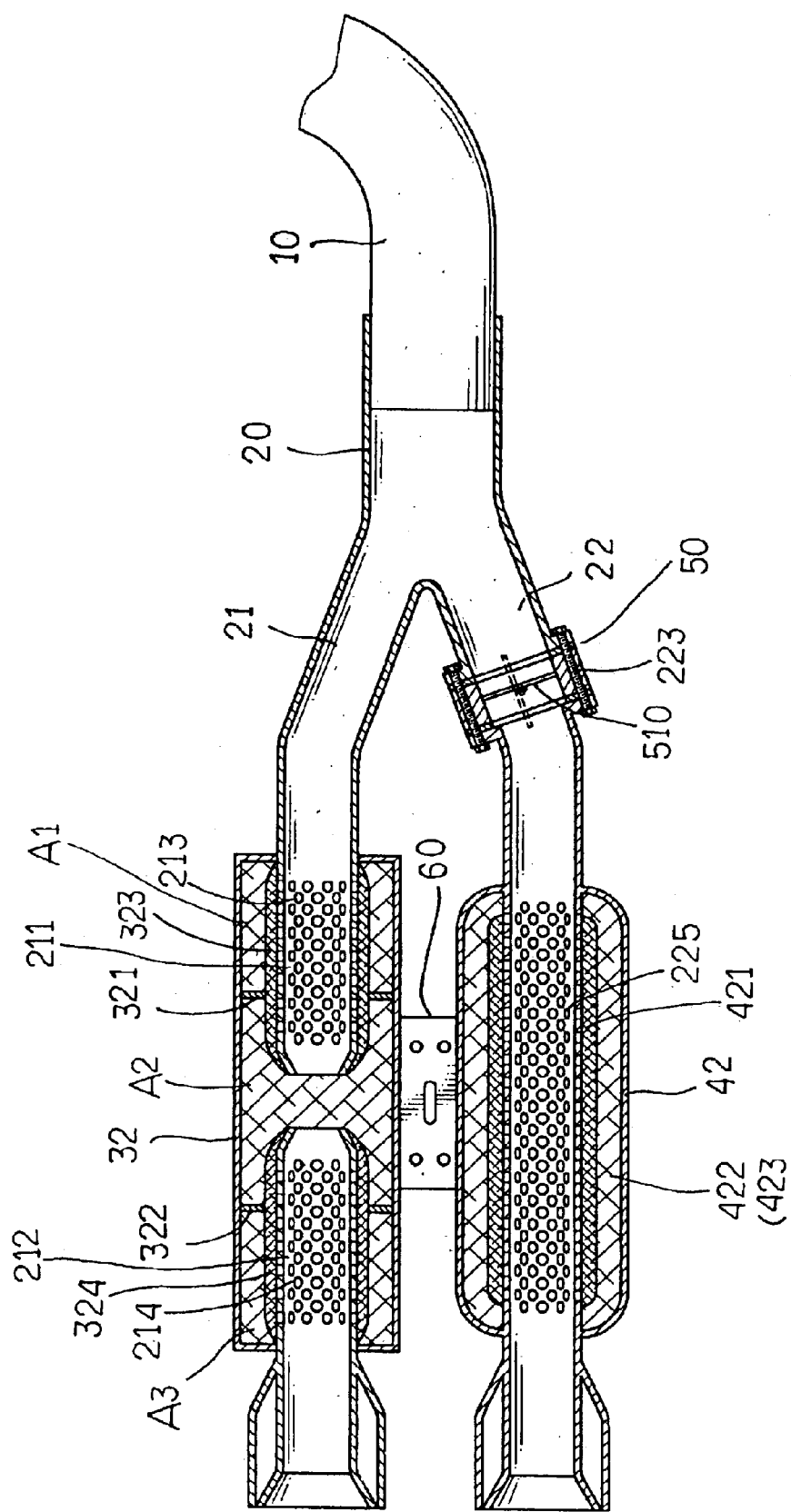
FIG. 2 is a cross sectional view of the present invention.
Figure 3:
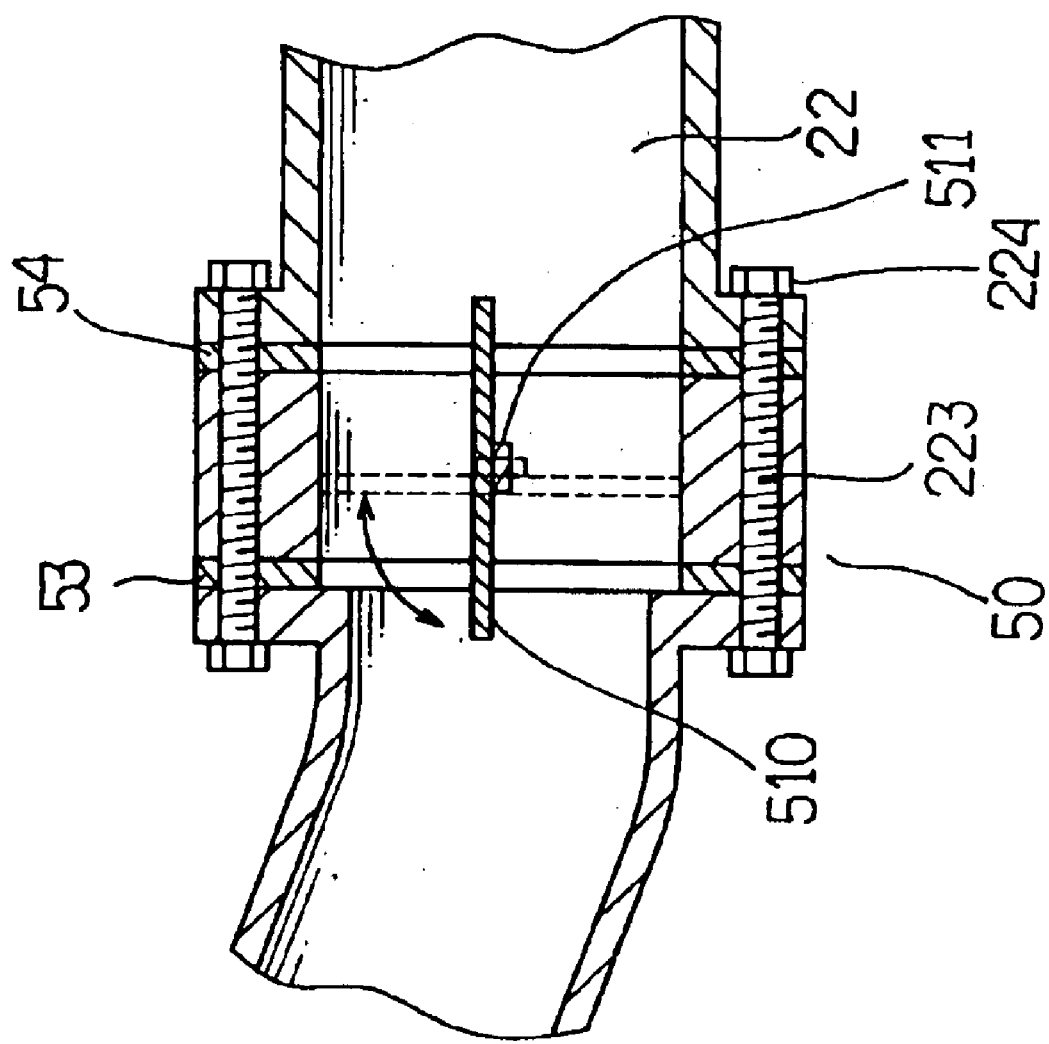
FIG. 3 is a schematic view showing the operation of a valve of the present invention.

Referring to FIGS. 1 to 3, the novel exhaust pipe of the present invention is illustrated. The exhaust pipe has a manifold 20. One end of the manifold 20 is connected to a distal end of a connecting tube 10. Another ends of the manifold 20 are extended with a first branch tube 21 and a second branch tube 22. The first branch tube 21 is connected to a first outer tube 32 and the second branch tube 22 is connected to a second outer tube 42. The second branch tube 22 has a controllable valve 50. The controllable valve 50 locked between locking seats 221, 222 by a screw 223 and a nut 224. A connecting piece 60 welded between the first outer tube 42 and the second outer tube 32.

The first branch tube 21 is segmented into a first 211 and second 212 section within a first outer tube 32, wherein the first 211 and second 212 sections have holes 213, 214 surrounded by a layer of stainless steel and cotton 323, 324, a first isolating plate 321 perpendicular to the first section 211 within the first outer tube 32, a second isolating plate 322 perpendicular to the second section 212 within the first outer tube 32, wherein the first 321 and second 322 isolating plates define three volumes A1, A2, A3 within the first outer tube 32, holes 213 from the first section 211 communicate with a first A1 and second A2 volume, holes 214 from the second section 212 communicate with a second A2 and third A3 volume.

The second branch tube 22 passes continuously through a second outer tube 42, wherein the portion of the second branch tube 22 within the second outer tube 42 has holes 225, a layer of stainless steel and cotton 421 covering the holes 225, glass fibers 423 fill the volume 422 between the second outer tube 42 and the layers of stainless steel and cotton 421.

A valve seat 51 is installed in the controllable valve 50. The front and rear sides of the valve seat 51 have respective washers 53, 54. The valve seat 51 controlled by the controller 52. The controller 52 has a motor which drives a gear 521. The gear 521 is engaged with a gear 512 on a rotary shaft 511. The rotary shaft 511 is combined with the valve 510.

In the following, a general travel condition and condition of moving on a high way will be described.

Figure 4:
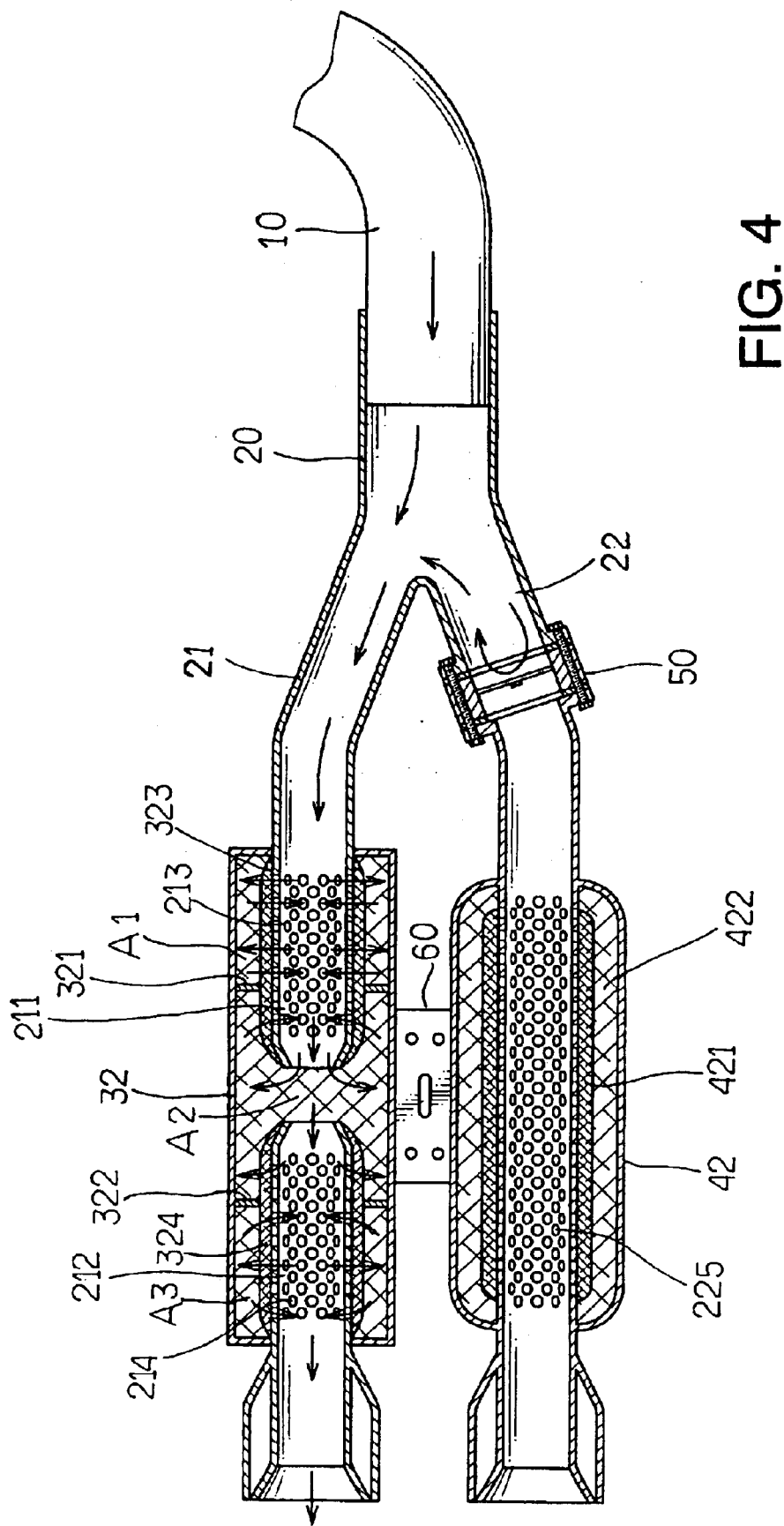
FIG. 4 is a schematic view showing the operation of the present invention.

1. In normal condition (referring to FIG. 4), since the controller 52 is closed, the valve 510 is also closed. The exhaust gas hindered by the valve 510 and thus gas flows into the first outer tube 32 from the first branch tube 21 of the manifold 20. Thereby, part of the gas flows out from the noise eliminating holes 213 of the first branch tube 21 and the exhaust gas is filtered by the glass fibers and stainless steel and cotton structure. Thus, gas flows in the first outer tube 32 so as to reduce the speed thereof. Then the exhaust gas is vented out. As a consequent, the flowing path and filtering process of the exhaust gas are prolonged so as to reduce noises (thereby, the amount of exhaust gas is matched to the requirement of a city).

Figure 5:
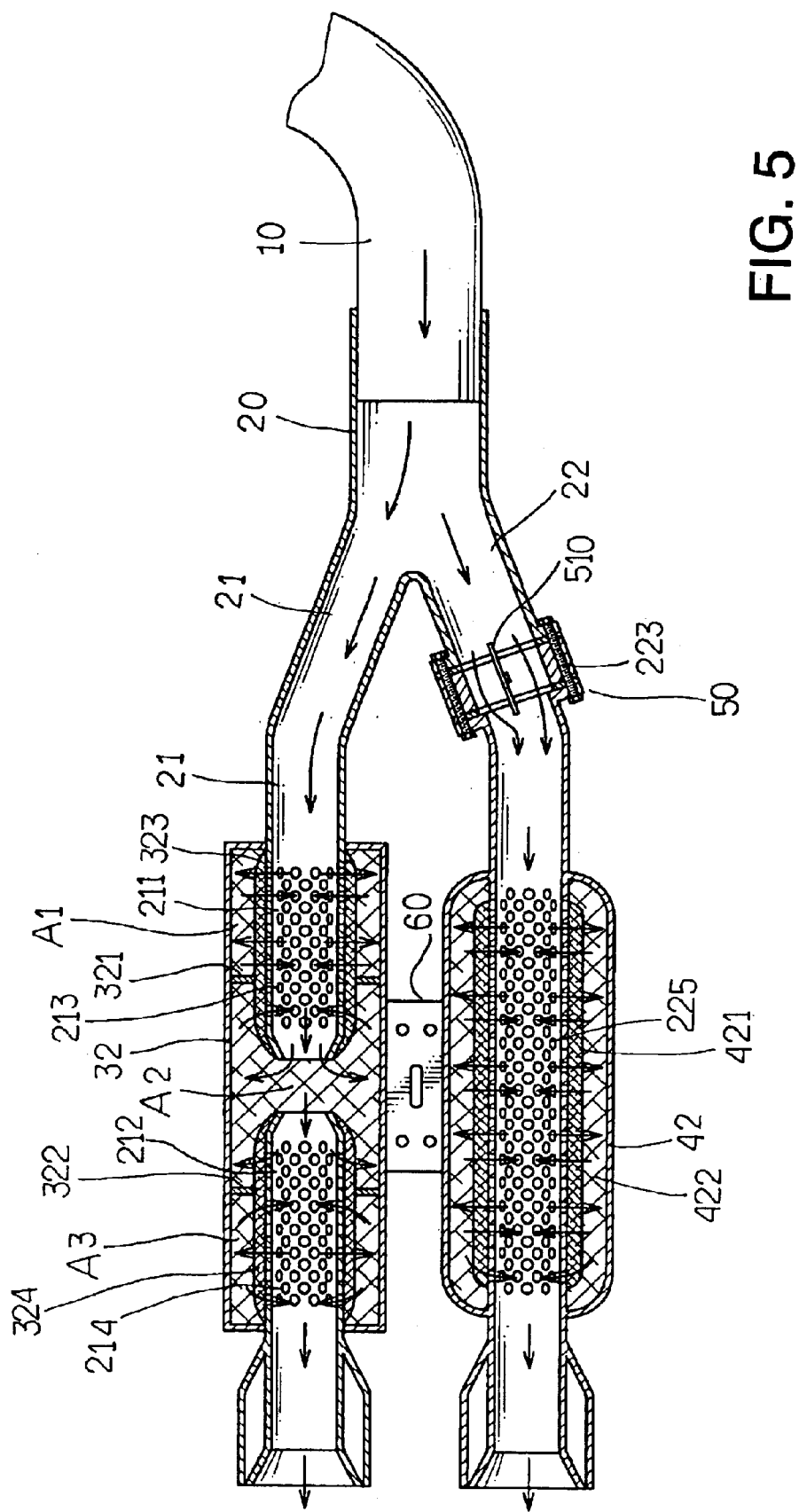
FIG. 5 is another schematic view showing the operation of the present invention.
Figure 6:
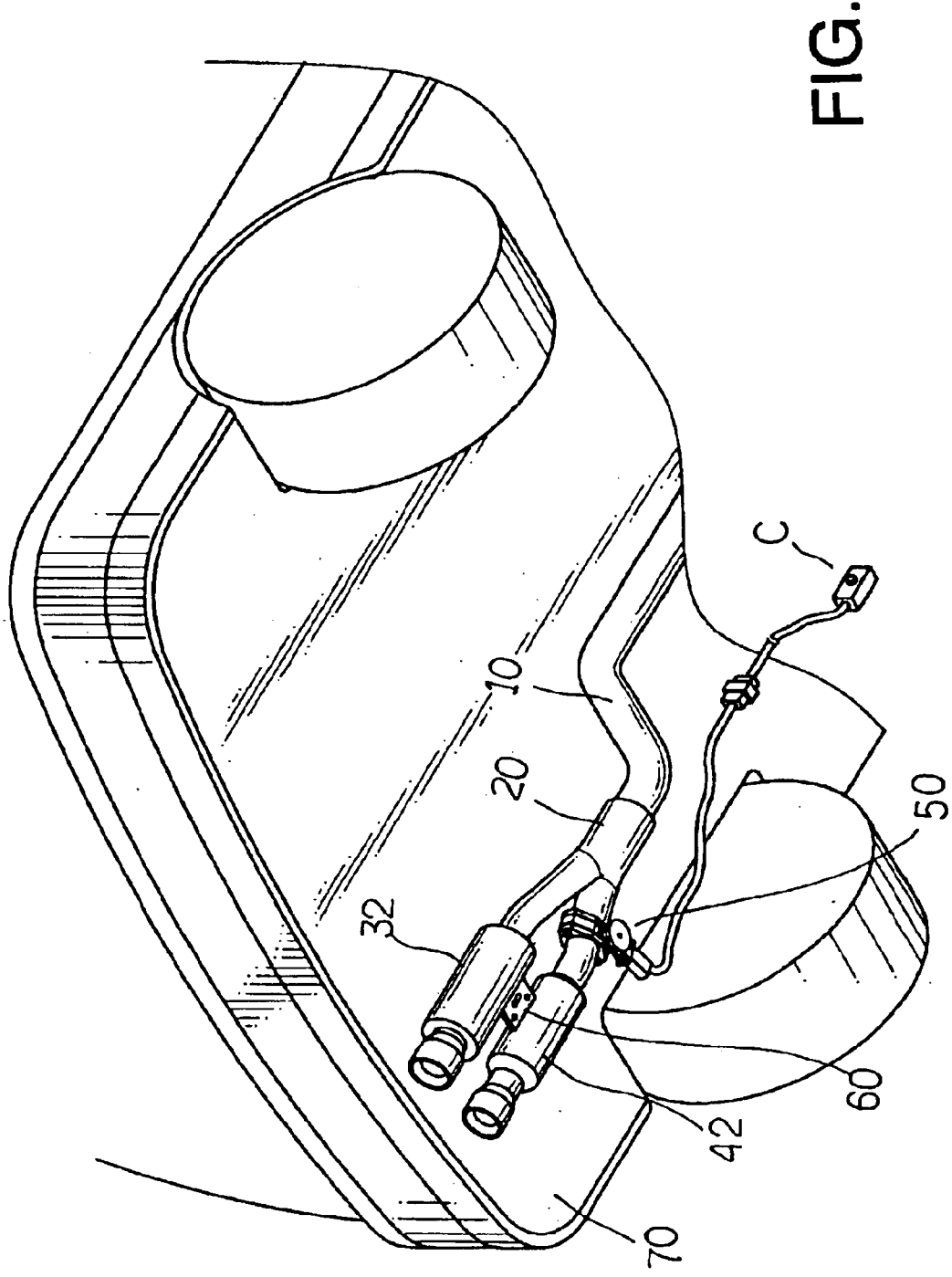
FIG. 6 is a schematic view showing that the present invention is installed to a car.

2. When a car 70 is to be accelerated for moving in mountains, suburbs, or highways (referring to, FIGS. 5 and 6). It is only necessary to open the switch. The controller 52 is connected to a switch C in the driver's seat in a car so as to control the actuation, stopping, positive rotation and negative rotation of the motor M. The gear 512 rotates to drive the valve 510 to rotate. When the valve 510 opens, part of vented gas enters into the first outer tube 32 (the flowing path has been described hereinabove, and thus the details will not be further described). Part of gas flows into the second outer tube 42. After the gas is filtered by the glass fibers 423 and stainless steel and cotton structure 421, the gas is vented out directly, or part of gas is vented out directly from the second outer tube 42. Therefore, the speed is accelerated.

By the present invention, the driver may control exhaust gas without needing to adjust the exhaust tube for controlling the amount of the exhaust pipe by other tools. As a result, the noise may be reduced easily and the performance of acceleration is enhanced.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An easily controlled exhaust tube having:
   a manifold; one end of the manifold being connected to a distal end of a connecting tube,
   the manifold being extended with a first branch tube and a second branch tube,
   the second branch tube has a controllable valve having a valve seat and washers,
   the first branch tube is segmented into a first and second section within a first outer tube, wherein the first and second sections have holes surrounded by a layer of stainless steel and cotton, a first isolating plate perpendicular to the first section within the first outer tube, a second isolating plate perpendicular to the second section within the first outer tube, wherein the first and second isolating plates define three volumes within the first outer tube, holes from the first section communicate with a first and second volume, holes from the second section communicate with a second and third volume,
   the second branch tube passes continuously through a second outer tube, wherein the portion of the second branch tube within the second outer tube has holes, a layer of stainless steel and cotton covering the holes, glass fibers fill the volume between the second outer tube and the layers of stainless steel and cotton,
   a connecting piece welded between the first outer tube and the second outer tube.

* * * * *